(12) United States Patent
Bensberg et al.

(10) Patent No.: US 11,106,673 B2
(45) Date of Patent: Aug. 31, 2021

(54) QUERY PLAN SHARING

(71) Applicant: SAP SE, Walldorf (DE)

(72) Inventors: Christian Bensberg, Heidelberg (DE); Kai Stammerjohann, Wiesloch (DE); Frederik Transier, Bammental (DE); Martin Richtarsky, Bad Schoenborn (DE)

(73) Assignee: SAP SE, Walldorf (DE)

( * ) Notice: Subject to any disclaimer, the term of this patent is extended or adjusted under 35 U.S.C. 154(b) by 196 days.

(21) Appl. No.: 16/209,651

(22) Filed: Dec. 4, 2018

(65) Prior Publication Data

US 2020/0175008 A1 Jun. 4, 2020

(51) Int. Cl.
*G06F 16/24* (2019.01)
*G06F 16/2455* (2019.01)
*G06F 16/23* (2019.01)
*G06F 16/248* (2019.01)
*G06F 16/2453* (2019.01)

(52) U.S. Cl.
CPC ......... *G06F 16/2455* (2019.01); *G06F 16/23* (2019.01); *G06F 16/248* (2019.01); *G06F 16/24542* (2019.01)

(58) Field of Classification Search
CPC . G06F 16/2455; G06F 16/23; G06F 16/24542
See application file for complete search history.

(56) References Cited

U.S. PATENT DOCUMENTS 7,529,728 B2 * 5/2009 Weissman ........... G06F 21/6218
2016/0378826 A1 * 12/2016 Bensberg ........... G06F 16/24552
707/721

\* cited by examiner

*Primary Examiner* — Loc Tran
(74) *Attorney, Agent, or Firm* — Mintz Levin Cohn Ferris Glovsky and Popeo, P.C.

(57) ABSTRACT

A method, a system and a computer program product for execution of queries. A first query is executed using a first query execution plan to generate a first result data by applying a first query operator to a first data stored in a first storage location. The first result data is provided to a second query execution plan for execution of a second query. The second query is executed on a second data stored in a second storage location in accordance with the second query execution plan. The second query execution plan includes a second query operator. Based on the execution of the second query, a second result data is generated in accordance with the second query execution plan by at least applying the second query operator to at least the provided first result data.

17 Claims, 11 Drawing Sheets

QUERY PLAN SHARING

TECHNICAL FIELD

This disclosure relates generally to data processing and, in particular, to optimization of query processing.

BACKGROUND

Computing systems rely on quick access data for their operations. Data is typically organized into tables for storage in database systems. To obtain data, queries are used. A query is a request for data/information from one or more tables in a database system(s). Queries can return results in various formats, including, pictorials, graphs, complex results, etc. Structured Query Language (SQL) is most commonly used language for writing queries.

SUMMARY

In some implementations, the current subject matter relates to a computer-implemented method for execution of queries. The method may include executing a first query using a first query execution plan and generating a first result data by applying a first query operator to a first data stored in a first storage location, providing the first result data to a second query execution plan for execution of a second query, executing the second query on a second data stored in a second storage location in accordance with the second query execution plan, the second query execution plan including a second query operator, and generating, based on the execution of the second query, a second result data in accordance with the second query execution plan and by at least applying the second query operator to at least the provided first result data.

In some implementations, the current subject matter may include one or more of the following optional features. Execution of the second query may include determining whether to apply the at least one second query operator to the provided first result data.

In some implementations, at least one second query operator may be applied to a combination of the provided first result data and at least a portion of the second data queried from the at least one second storage location. In some implementations, the method may also include preventing application of the second query operator to the provided first result data upon determination that the second query operator is not applicable to the provided first result data.

In some implementations, the method includes applying at least one additional second query operator to generate a subset of the second result data.

The method may also include receiving an update to the first data stored in the first storage location, executing the first query on at least the updated first data stored in the first storage location and generating an updated first result data, and providing the updated first result data to the second query execution plan. The updated first data may include at least one of the following: the update to the first data, and a combination of the updated first data and the first data. The execution of the first query on at least the updated first data may be performed upon at least one of the following: receiving the update to the first data, and repeating the executing of the first query.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

In some instances, queries on the same or similar data can be executed multiple times. Such queries can be the same or different and can include a variety of operators. Such repeated execution of same/similar queries on similar data can consume a significant amount of compute resources, memory, and time. Thus, there is a need for a way to allow queries to determine whether to reuse results that have been obtained during prior execution of queries, thereby allowing queries to share query execution plans and any intermediate and/or final results.

To address these and potentially other deficiencies of currently available solutions, one or more implementations of the current subject matter relate to methods, systems, articles of manufacture, and the like that may, in some implementations, provide an ability to optimize execution of queries through sharing of query execution results.

Figure 1:
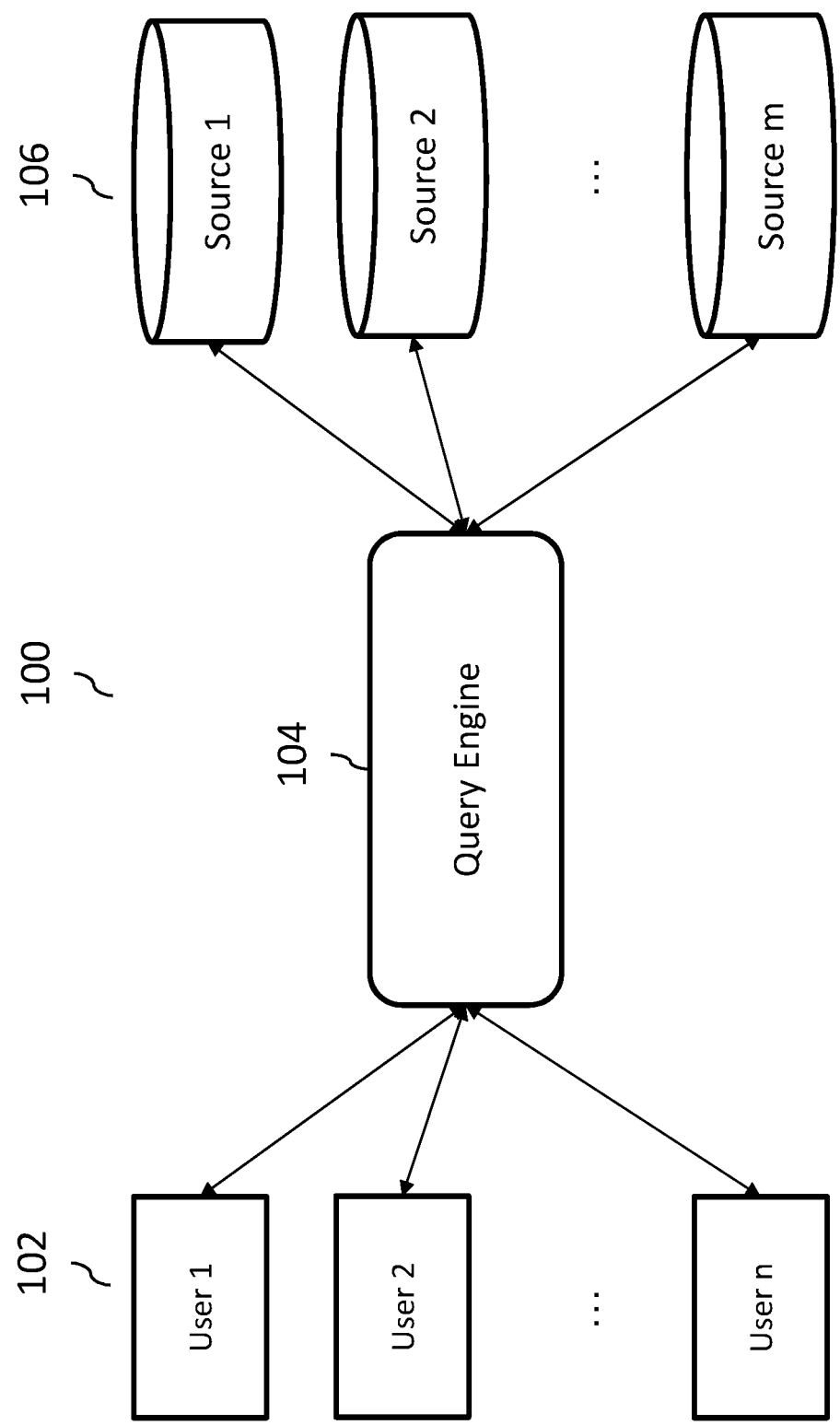
FIG. 1 illustrates an exemplary system for processing of queries, according to some implementations of the current subject matter.

FIG. 1 illustrates an exemplary system 100 for processing of queries, according to some implementations of the current subject matter. The system 100 may include one or more users (user 1, user 2, . . . user n) 102, a query engine 104, and one or more data sources (source 1, source 2, . . . , source m) 106. The users 102, the query engine 104, and the data sources 106 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Data sources 106 may include at least one of the following: databases, storage locations, memory locations, and/or any combination of hardware and/or software components.

The query engine 104 may include any combination of software and/or hardware components and may be configured to receive and execute a query from one or more users 102 to obtain data from one or more sources 106.

Execution of a query may typically require generation of a query plan or query execution plan, which may be an ordered set of operations that may be used to access stored data (e.g., access data in a SQL relational database management system). When a query is submitted to a database, a query optimizer may evaluate various plans for executing the query and may return what it considers the best possible plan. In some cases, database users and/or administrators may manually examine and/or configure the plans generated by the query optimizer to obtain better results/performance.

Figure 2:
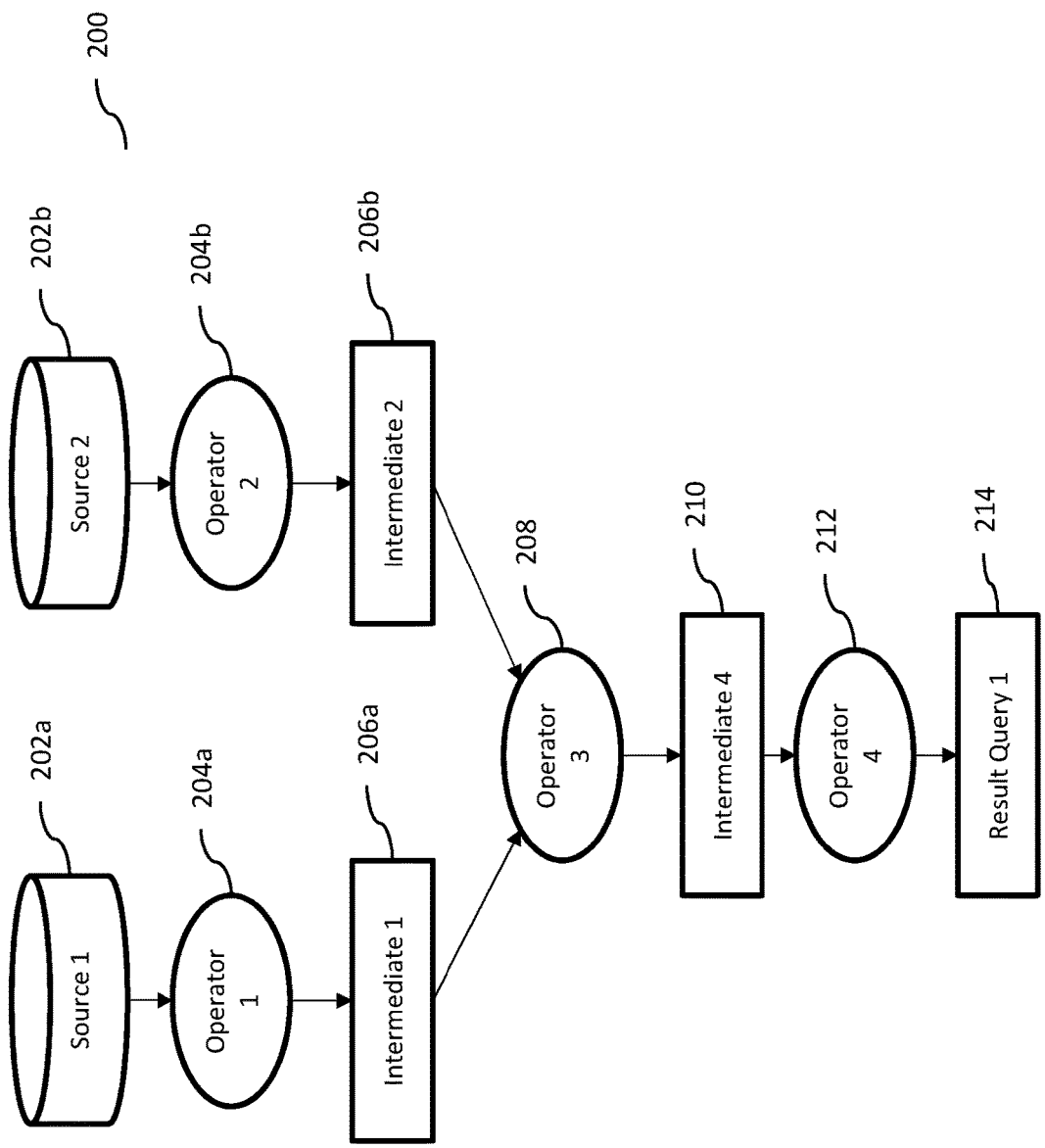
FIG. 2 illustrates an exemplary query execution plan for a query.

FIG. 2 illustrates an exemplary query execution plan 200 for a query (e.g., "Query 1"). The query plan 200 may include accessing source 1 202a and source 2 202b and applying operators 204a, 204b to the data stored in the sources 202a, 202b, respectively (i.e., operator 1 204a is applied to the data in the source 1 202a; operator 204b is applied to the data in the source 2 202b). Operators may include any type of operators (e.g., filters, sorts, joins, semi-joins, etc.) that may seek to obtain specific data that may be sought by a user.

Once the operators are applied to the data in sources 1 and 2, the query 200 may generate intermediate query results intermediate 1 206a and intermediate 2 206b, respectively. As part of the query execution plan, further operators (e.g., operator 3 208) may be applied to the intermediate results 206. Any type of further operators may be used (e.g., joins, filters, inner joins, etc.). Application of the operator 3 208 may be configured to generate further intermediate result (e.g., intermediate 4 210). Additional operators (e.g., operator 4 212) may be applied to the intermediate 4 210 result to generate query results (e.g., result query 1 214).

In some implementations, the current subject matter may allow different queries to share intermediate results of execution. Sharing of results may be based on various parameters, operators, plan, etc. of the query as well as data that is being sought by the queries. By way of a non-limiting example, a first query may seek data related to customer cellular telephone usage in a particular country (e.g., Germany), whereas the second query may seek data related to product names of cellular telephones used by customers in the same country. Thus, various intermediate results obtained as during execution of the first query may be used by the second query. The queries may have different execution plans, partially access different sources of data, and have different operators, and still be able to reuse one or more intermediate and/or final results of each execution. Once the results are obtained by one query, another query may reuse them and apply its own operators to obtain the results that it desires. In some implementations, results of queries may be reused when queries share a common execution plan and/or have similar portions of execution plans. Alternatively, results may be reused when one of the query execution plans is a subset or a superset of another query execution plan, and/or the same and/or a superset and/or subset of data (e.g., a column of a table) is requested. The intermediate results that are obtained by one query may be stored in memory for ease of access by another query. In some implementations, the intermediate results may be stored in memory for a predetermined time, after expiration of which they may be purged. In alternate implementations, the intermediate results may be stored for longer periods of time, especially if they are obtained as a result of querying same kind of data. Moreover, the intermediate results may be updated (e.g., as a result of re-executing of the first query) and the updated results may be provided to other queries that have used the original intermediate results in prior executions, so that updated final results may be generated.

Figure 3:
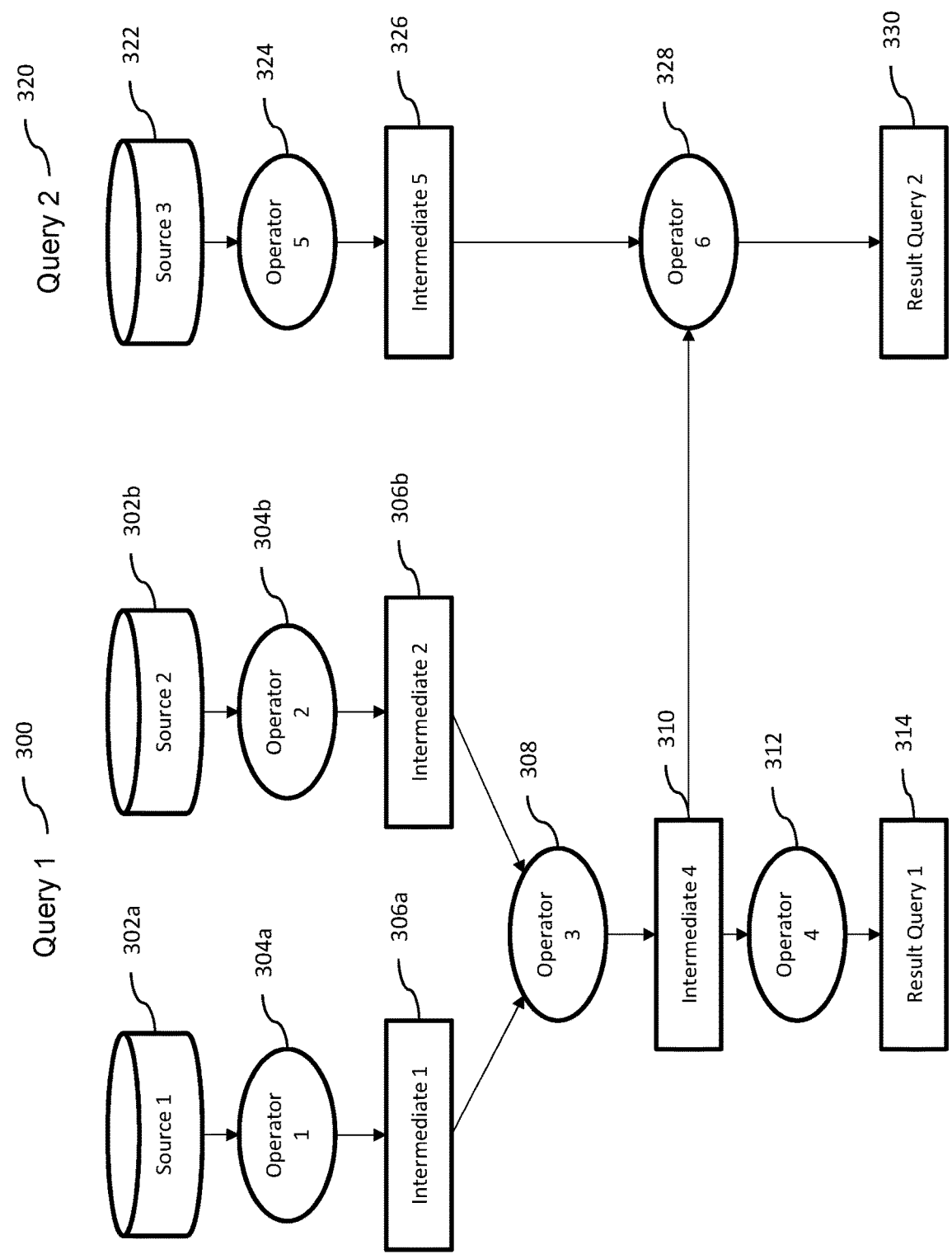
FIG. 3 illustrates an exemplary process for execution of multiple queries, according to some implementations of the current subject matter.

FIG. 3 illustrates an exemplary process for executing of multiple queries, according to some implementations of the current subject matter. FIG. 3 illustrates execution of queries 300 and 320. As may be understood, more than two queries may be executed. The queries may be executed simultaneously or in any order. As shown in FIG. 3, the query 320 may be configured to use one of the results (any intermediate results, final results, etc.) of execution of query 300. In some implementations, the query 320 may use the results of the query 300 within a predetermined period of time. For example, execution results of the query 300 may be valid for only a predetermined period of time (e.g., one or more hours, days, weeks, months, etc.) or until the source tables are updated, after which the results will become outdated and hence, might not be reliable. In some implementations, the current subject matter may determine whether results of one query may be reused by another query based on the "expiration date" of the results. For example, an expiration date and time may be assigned to the results of the first query to ensure that other queries do not use outdated results. Alternatively, the current subject matter may determine whether updated information is available that may affect the results of the first query and hence, prevent other queries from reusing the results of that query until they are updated.

Similar to FIG. 2, the query plan 300 may include a source 1 302a and a source 2 302b that may be accessed during execution of the query 300. Operators 304a, 304b may applied to the data stored in the sources 302a, 302b, respectively (i.e., operator 1 304a is applied to the data in the source 1 302a; operator 304b is applied to the data in the source 2 302b). Operators may include any type of operators (e.g., filters, sorts, joins, semi-joins, etc.) that may seek to obtain specific data that may be sought by a user.

Once the operators are applied to the data in sources 1 and 2, the query 300 may generate intermediate query results intermediate 1 306*a* and intermediate 2 306*b*, respectively. Further operators (e.g., operator 3 308) may also be applied to the intermediate results 306. Any type of further operators may be used (e.g., joins, filters, inner joins, etc.). Application of the operator 3 308 may be configured to generate further intermediate result (e.g., intermediate 4 310). Additional operators (e.g., operator 4 312) may be applied to the intermediate 4 310 result to generate query results (e.g., result query 1 314).

Execution of the query 320 may involve accessing source 3 322 for data. For example, source 3 322 may contain data relating to types of mobile devices that are being used in a particular country, e.g., Germany, whereas sources 1 and 2 302*a*, 302*b* may include mobile device usage data in the same country. An operator 5 324 may be applied to the data contained in source 3 322 (e.g., operator 5 may be a filter, a sort, etc., and/or any other operator and/or any combination thereof). Application of the operator 5 may generate an intermediate result intermediate 5 326 (e.g., a list of most commonly used mobile devices in Germany).

The query 320 may also include an additional operator 6 328 that may be applied to the intermediate 5 results. In order to generate final results of the query 320, the operator 6 328 may require intermediate result 4 310 that has been obtained during execution of the query 300. The query 320 may determine whether the intermediate result 4 310 is still available (i.e., not purged from memory), and whether that result is up-to-date (i.e., has not gone past its expiration date). If the intermediate result 4 is still available and/or is up-to-date, the operator 6 328 may be applied to the combination of the intermediate result 4 and the intermediate result 5 to generate final result 330 of the query 300. In some implementations, the current subject matter may be configured to determine whether the intermediate result 4 312 is up-to-date. If it is not up-to-date, the current subject matter may determine whether the outdated results may still be used during execution of the query 320. For example, the intermediate result 4 is obtained based on an old or cold storage data that was generated and stored in the past, and/or has been used during execution of other queries. If it is determined that the intermediate result 4 is outdated and cannot be used during execution of the query 320, the current subject matter may be configured to request and/or perform an update to the intermediate result 4 312 and then use the updated result during execution of the query 320. In some implementations, the query 320 may or may not use existing prior intermediate and/or prior final results of other queries. In both scenarios, the output/execution process of the query may be similar (or even identical), however, if a query reuses the prior results, it may have shorter execution runtime, which may be noticeable to a user.

In some implementations, determination of whether results of one query may be used by another query may be based on a variety of factors. For example, queries may be seeking data that may be related to similar subject matter (e.g., mobile device usage and type of mobile devices used, etc.). By way of another example, reuse of results may happen if the same users perform a navigation step in an end-user application to drill down on information and/or to show related information. Alternatively, query execution plans of a query may specifically call for data that may be obtained during execution of another query. As may be understood, there may be other factors for determination whether to reuse results (and which results to reuse) of other queries.

Figure 4:
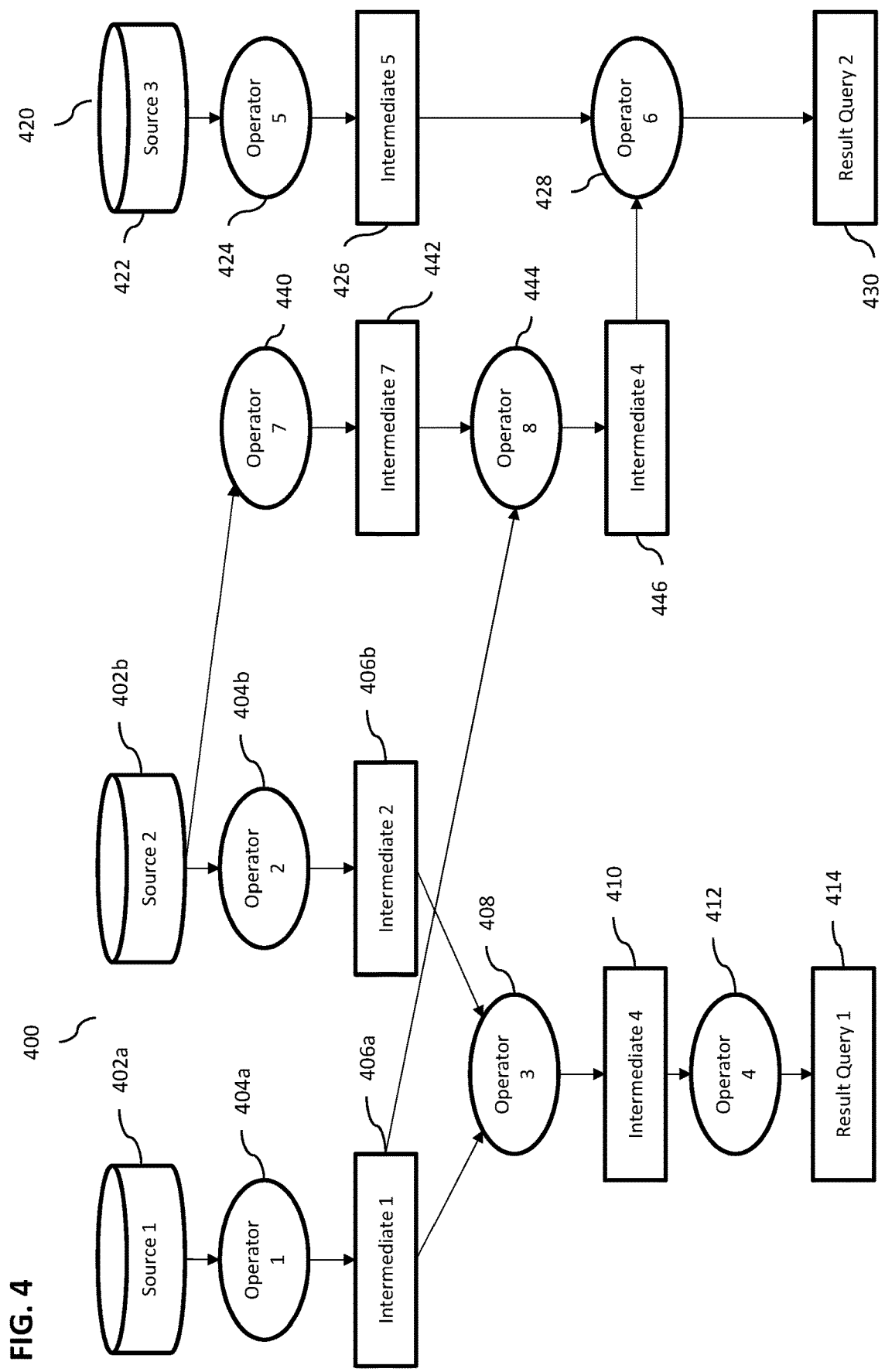
FIG. 4 illustrates an exemplary execution of multiple queries where some generated results cannot be reused by queries, according to some implementations of the current subject matter.

In some implementations, query execution plans may include operators (e.g., different filters, sorts, etc.) that may prevent reuse of results of other queries. FIG. 4 illustrates an exemplary execution of multiple queries where some generated results cannot be reused by queries, according to some implementations of the current subject matter. FIG. 4 illustrates execution of queries 400 and 420. Similar to FIGS. 2 and 3, the query plan 400 may include a source 1 402*a* and a source 2 402*b* that may be accessed during execution of the query 400. Operators 404*a*, 404*b* may applied to the sources 402*a*, 402*b*, respectively. Operators may be any type of operators (e.g., filters, sorts, joins, semi-joins, etc.).

Upon application of the operators, the query 400 may generate intermediate query results intermediate 1 406*a* and intermediate 2 406*b*, respectively. Further operators (e.g., operator 3 408) may also be applied to the intermediate results 406. Application of the operator 3 408 may be configured to generate intermediate result intermediate 4 410. Additional operator 4 412 may be applied to the intermediate 4 410 result to generate query results 414.

Moreover, the query plan 400 may include an additional execution path. Another query operator (i.e., operator 7 440) may be used to apply to data in the source 2 402*b*. For example, the intermediate results that may be obtained as a result of application of operator 2 404*b* to the data in the source 2 402*b* (e.g., WHERE country='DE') may be different from the results of application of the operator 7 to the data in source 2 (e.g., WHERE country='FR'). Hence, the results of application of operation 2 cannot be shared with the additional execution path of the query plan 400. The operator 7 may generate intermediate results intermediate 7 442 (e.g., customer mobile phone usage data in France, as opposed to customer mobile phone usage data in Germany, which resulted from application of operator 2).

However, as part of the same execution path, operator 8 444 may be applied to the intermediate result 7 442 and may reuse the intermediate results 1 406*a* even though operator 7 442 was different from operator 2 404*b*. Application of operator 8 444 may generate intermediate results 4 446. The intermediate result 446 may be reused by the operator 6 428 of the query 420, similar to the way query 320 is using intermediate results of the query 300 as shown in FIG. 3.

Similar to FIG. 3 and query 320, execution of the query 420 may involve accessing source 3 422 for data. An operator 5 424 may be applied to the data contained in source 3 422 (e.g., operator 5 may be a filter, a sort, etc., and/or any other operator and/or any combination thereof). Application of the operator 5 may generate an intermediate result intermediate 5 426.

The query 420 may include an operator 6 428 that may be applied to the intermediate 5 results. In order to generate final results of the query 420, the operator 6 428 may require intermediate result 4 446 that has been obtained during execution of the query 400 and, in particular, resulting from application of operator 8 444. Similar to FIG. 3, the query 420 may determine whether the intermediate result 4 446 is still available (i.e., not purged from memory), and whether that result is up-to-date (i.e., has not gone past its expiration date and/or the source tables were updated). If the intermediate result 4 is still available and/or is up-to-date, the operator 6 428 may be applied to the combination of the intermediate result 4 446 and the intermediate result 5 426 to generate final result 430 of the query 400. If the intermediate result 4 is no longer available, not up to date, etc., execution of the query 420 may be stopped, paused, etc., as described above.

Because operators 2 and 7 seek to generate resulting data that is different from each other and hence, cannot be shared or reused, the results of the queries 400 and 420 are different. For example, operator 2 is WHERE country='DE' (i.e., seeking to generate mobile telephone data from Germany) and operator 7 is WHERE country='FR' (i.e., seeking to generate mobile telephone data from France), the final results of queries 400 and 420 will different in accordance with the above countries, i.e., results 414 of query 400 will be specific to Germany and results 430 of query 420 will be specific to France, even though the execution plan of query 420 reuses some of the results from execution of the query 400.

Figure 5:
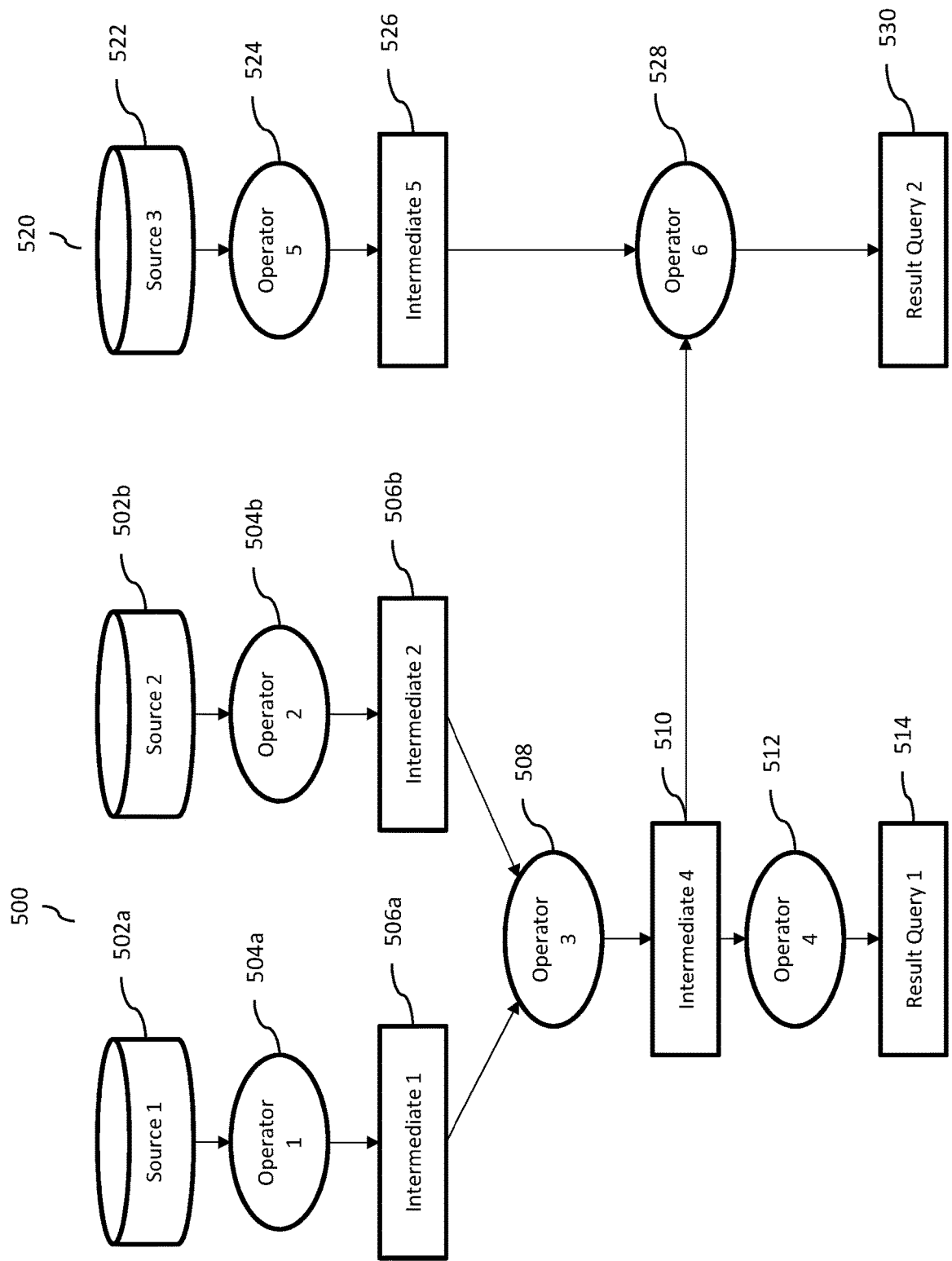
FIG. 5 illustrates an exemplary process for optimization of query executions, according to some implementations of the current subject matter.

FIG. 5 illustrates an exemplary process for optimization of query executions, according to some implementations of the current subject matter. FIG. 5 illustrates query plans 500 and 520. The query plan 500 may include accessing a source 1 502a and a source 2 502b and application of operators 504a, 504b, respectively. Operator 1 504a may be applied to the data in the source 1 502a in similar fashion as shown in FIGS. 3 and 4 to generate intermediate result 1 506 and passing it to the operator 3 508.

Operator 504b may be applied to the data in the source 2 502b. This operator may include a combination of operators. For example, this operator may be seeking mobile telephone usage data for users located in both countries Germany and France, e.g., WHERE country='DE' OR country='FR'. Such filtering mechanism may generate larger intermediate result 2 506b as compared to intermediate results 2 306b and 406b shown in FIGS. 3 and 4, respectively. Such "broadening" of the scope of the operators may allow querying, obtaining and manipulating (e.g., applying split operators to divide obtained data into smaller subsets) larger amounts of data and thus, generating larger results data pool.

Similar to the discussion above, operator 3 508 may be applied to the intermediate result 506a and larger intermediate result 506b to generate intermediate result 4 510. Because intermediate result 506b was larger, application of operator 3 may also generate a larger intermediate result 4 510. Operator 4 512 may be configured to reduce the size of the intermediate result 4 510. This may be accomplished through application of a filtering operator, e.g., filter: WHERE country='DE', which may narrow down the final results 514 to, for example, mobile telephone data, in Germany only.

Execution of the query 520 may involve accessing source 3 522 for data as well as usage of the larger result pool obtained during execution of the query 500. Similar to the queries discussed above in connection with FIGS. 3 and 4, an operator 5 524 may be applied to the data contained in source 3 522 to generate an intermediate result 5 526.

Operator 6 528 that may be applied to the intermediate 5 results as well as reuse intermediate results 4 510. However, the operator 6 528 may reduce the result pool in intermediate result 4 510 by, for example, adding a filter operator, e.g., filter: WHERE country='FR', which will narrow down the final results 540 to data in France only. As discussed above, the results 510 may be accessed if they are still available and/or whether they may be used (i.e., not invalid/expired).

In some implementations, sharing of the results among queries may cause a higher "base level" of consumed memory, but allows for a reduced memory consumption per individual query execution. A higher base level may be justified in cases where there is plenty of free memory that is not otherwise consumed. Also, the intermediate results may be marked for immediate removal from memory if the memory is needed for other purposes. The main motivation is faster execution time. In some implementations, as stated above, queries may reuse results involving cold data. Cold data may be data that is not frequently accessed and/or even more infrequently updated. For example, cold data may include sales orders that are more than three years old. If such data is accessed, a typical query may be the total amount of sales per year. Such a value may easily be cached and/or hardly changed. In some implementations, some cold data may continue to persist in memory so that it may be used during execution of similar queries. This may avoid loading all cold data that may be stored in a cold data storage (i.e., storage that is not frequently accessed). Further, it may be possible to persist the query result and/or to query this persisted cache when needed rather than loading the original cold tables.

In some implementations, Data Manipulation Language (DML), such as, INSERT, UPDATE and/or DELETE commands may be used to alter data in source tables. Such operation may render intermediate results outdated, however, this might not have an immediate effect, as a change to data has to be committed first by the client. Transactions that are already running might not necessarily read new data based on a configured transaction isolation level. In some implementations, transactions may read data using a particular snapshot. The snapshot might not necessarily be the latest snapshot and, hence, queries may return data that is consistent, even though not the latest. This may also allow intermediate results to remain valid for some transactions even though the underlying base table has been modified. This may require that each cached intermediate result keeps track of the snapshot that was used during its built-up. If a query determines whether it may use the cached intermediate result, during execution, it may compare its own snapshot with the snapshot that was used during built-up.

Figure 6:
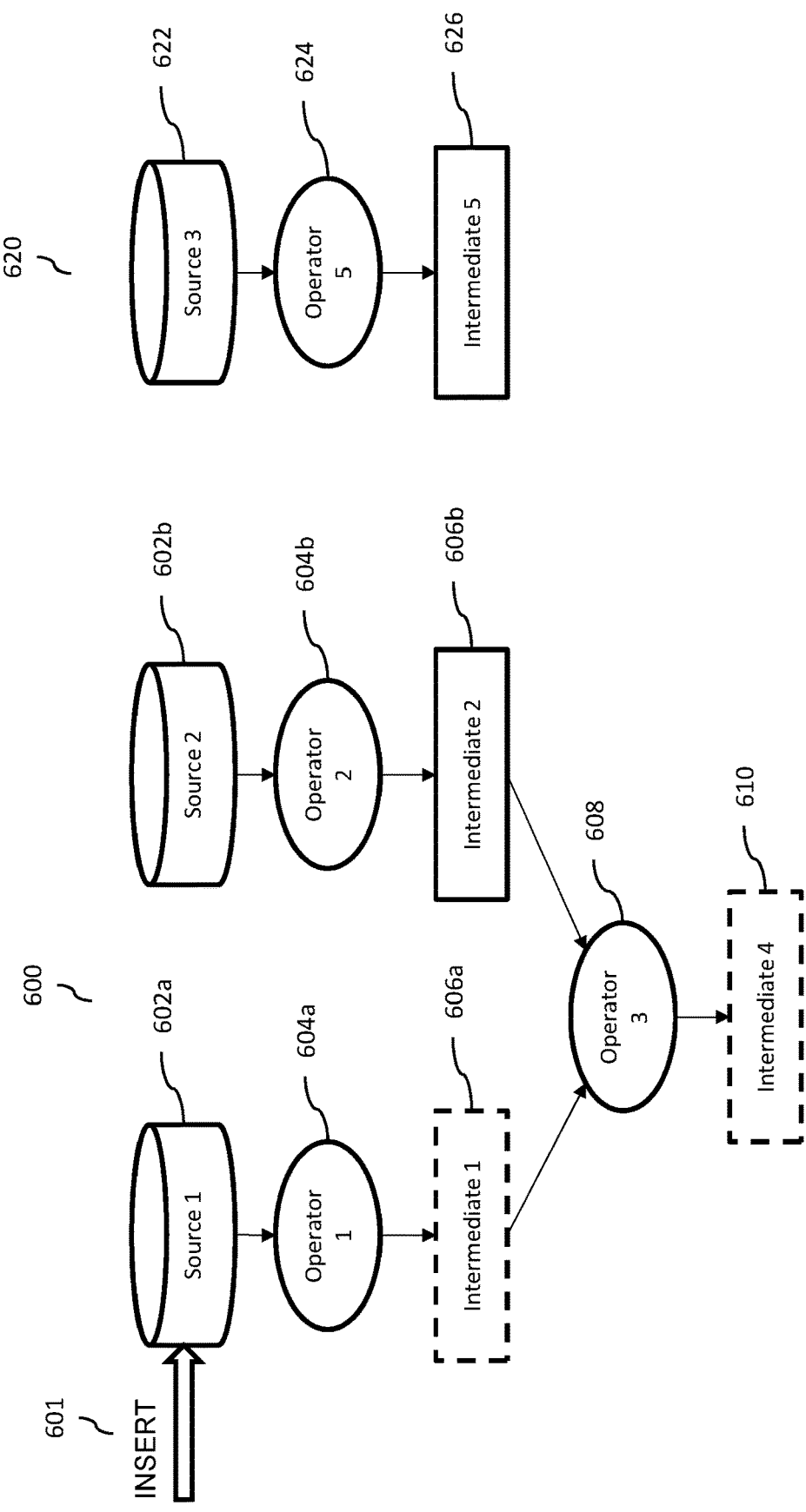
FIG. 6 illustrates an exemplary process for updating results of queries execution, according to some implementations of the current subject matter.

FIG. 6 illustrates an exemplary process for updating results of queries execution, according to some implementations of the current subject matter. As shown in FIG. 6, an INSERT statement 601 may be included into the query 600 (e.g., data added, updated, modified, deleted, etc. to/from source 1 602a), where the query 600 may have been previously executed and generated intermediate/final results (similar to the queries shown in FIGS. 3-5). In some implementations, addition of the INSERT statement may automatically trigger re-execution of one or more portions of the query 600. Here, intermediate result 606a and hence, intermediate result 610 may be re-calculated (e.g., updated using data that has been changed in the source 602a). In alternate implementations, addition of the INSERT statement to data in the source 602a may delay updates to the intermediate results 606a and 610 until the next time query 600 is executed. The decision whether to automatically update intermediate results or to wait until next time query 600 is execute may be based on query 600's (and/or query 620) execution frequency. For example, more frequent executions of the query 600 (and/or query 620) may require most up-to-date data and, hence, automatic update to the intermediate results may be beneficial. Alternatively, if the query 600 (and/or query 620) are not as frequently executed, next time the query 600 (and/or query 620) is executed, an appropriate update may be propagated to the results.

Update to the intermediate results of the query 600 may also trigger a determination whether other queries, e.g., query 620, that previously reused its intermediate results may reuse the updated results and/or whether sharing of the results among queries should be stopped. Doing so may be based on a determination that the data that was changed is no longer required and/or not compatible with the query that used the previous results. Thus, consumption and/or application of operators to intermediate results 4 610 and intermediate results 5 626 may be held (e.g., temporarily suspended) pending a determination whether and/or which operators may be applied to the generated intermediate results 610 and 626.

Figure 7:
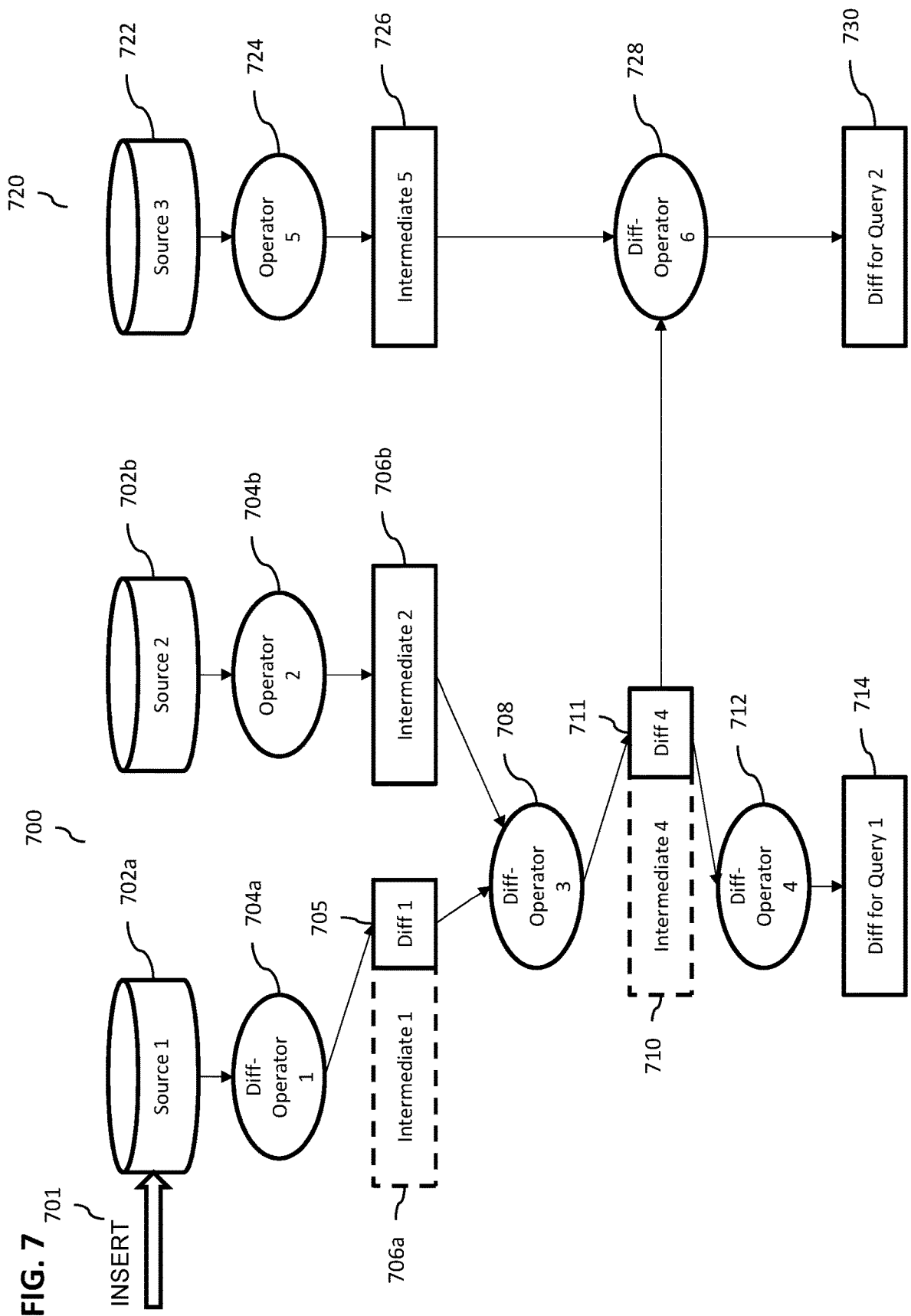
FIG. 7 illustrates an exemplary process for updating results of queries execution, according to some implementations of the current subject matter.

FIG. 7 illustrates an exemplary process for updating results of queries execution, according to some implementations of the current subject matter. Similar to FIG. 6, an INSERT statement 701 (e.g., data may be added, modified, deleted, etc.) may be added to the source 1 702a. Addition of the INSERT statement 701 may cause changes to the query execution plan 700 and in particular how resulting data obtained from source 1 702a may be changed. A new operator 704a (e.g., DIFF-Operator 1) may be applied to the updated data from source 1 (which may include the INSERT statement 701) to generate an intermediate result 706a along with a difference (DIFF 1) 705. In some implementations, the operator 704a may be the same operator that was used during executions of query 700 before addition of the INSERT statement 701. In some implementations, the operator 704a may be applied only to the new data that has been supplied to the source 1 702. Alternatively, the operator 704a may be applied to the entire set (including the updated data) in source 1.

Generation of the updated intermediate result 706a may trigger an update to the intermediate result 4 710, which may now include an updated portion (DIFF 2) 711. The intermediate result 710 along with its updated portion 711 may be generated as a result of application of new and/or previously used operator 3 708 (the operator 3 may be new based on the updated information supplied to source 1 or may be the same operator that was previously used prior to the update). Similarly, the operator 708 may be applied only to the updated portion (i.e., DIFF 1 705) and/or to the entire intermediate result 706a (including the updated portion 705) and/or the intermediate result 2 706b, and/or any combination thereof To generate updated results of the query 700, operator 4 712 may be a new operator and/or a previously used operator and may be applied only to the updated portion 711 of the result 710 and/or to the entire intermediate result 4 (including the DIFF 4 portion 707). Update to the intermediate 4 results (including the DIFF 4 portion 707) may also trigger an update to the results that are generated as a result of execution of the query 720. In this case, a new operator 728 (and/or a previously used operator 728) may be applied to the updated intermediate results 710 (and/or only to the updated portion DIFF 4 707) to generate an updated query results 730. The updated final query results may be combined with previously generated results. Alternatively, the updated final query results may replace previously generated results.

In some implementations, a DIFF operator 704a may for example only consider the new data and the existing previous result but does not need to process the source entirely to build result 706a or 705. For example, a DIFF operator for an INSERT operation 701 may only propagate the newly inserted row into the DIFF result 1 705. In another example, the DIFF operator may be a MAX operator. A MAX operator may determine the highest value in a column. If the INSERT 701 does not change the previous maximum result (kept in 706a respectively 705), there is no change needed at all and processing may already conclude without changes. No further operators may need to be executed, no other intermediate results may need to be refreshed and no new DIFF operator for the query may be provided to any client.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 8:
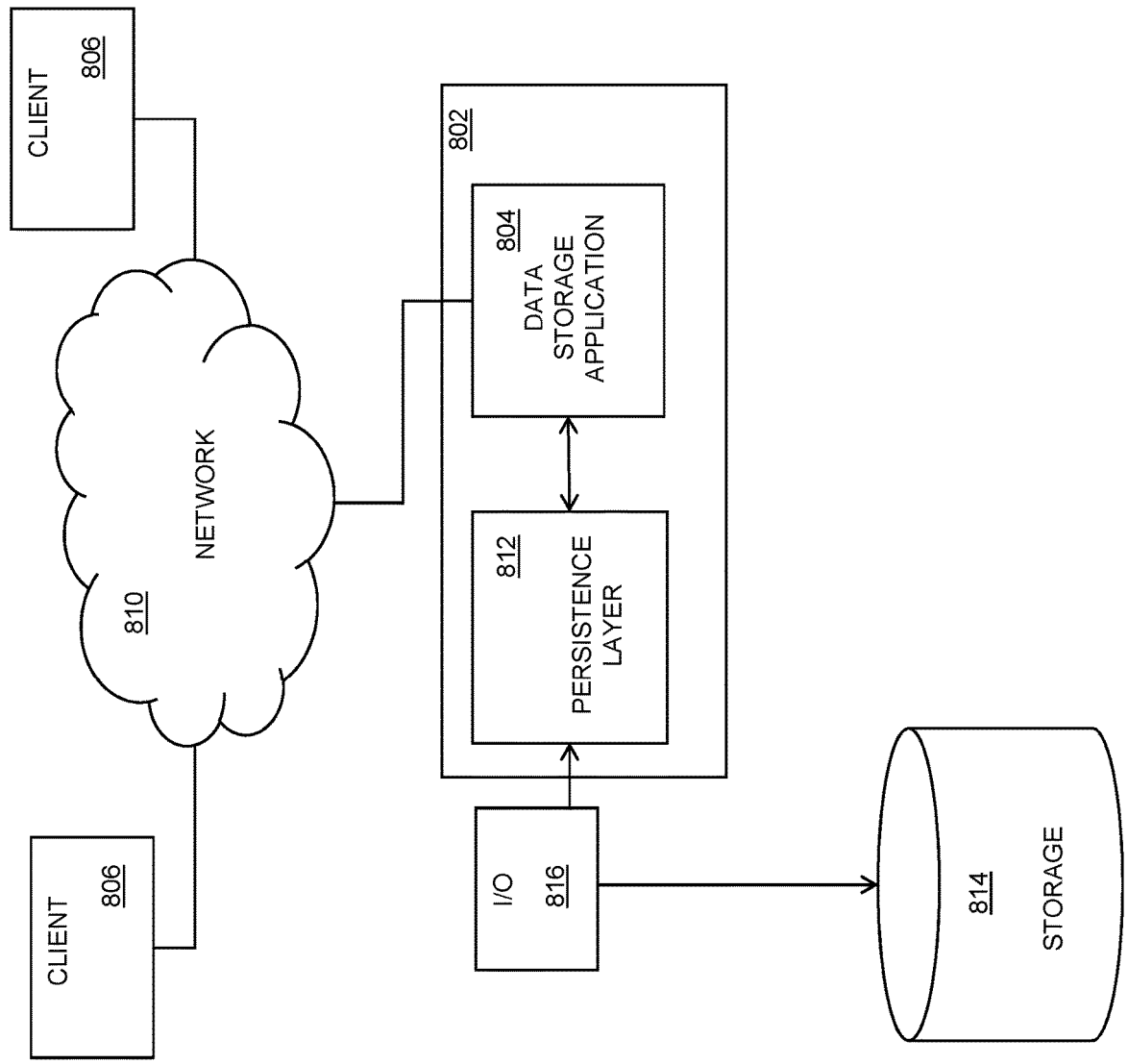
FIG. 8 is a diagram illustrating an exemplary system including a data storage application, according to some implementations of the current subject matter.

FIG. 8 illustrates an exemplary system 800 in which a computing system 802, which may include one or more programmable processors that may be collocated, linked over one or more networks, etc., executes one or more modules, software components, or the like of a data storage application 804, according to some implementations of the current subject matter. The data storage application 804 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 802 as well as to remote users accessing the computing system 802 from one or more client machines 806 over a network connection 810. One or more user interface screens produced by the one or more first modules may be displayed to a user, either via a local display or via a display associated with one of the client machines 806. Data units of the data storage application 804 may be transiently stored in a persistence layer 812 (e.g., a page buffer or other type of temporary persistency layer), which may write the data, in the form of storage pages, to one or more storages 814, for example via an input/output component 816. The one or more storages 814 may include one or more physical storage media or devices (e.g. hard disk drives, persistent flash memory, random access memory, optical media, magnetic media, and the like) configured for writing data for longer term storage. It should be noted that the storage 814 and the input/output component 816 may be included in the computing system 802 despite their being shown as external to the computing system 802 in FIG. 8.

Data retained at the longer term storage 814 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 9:
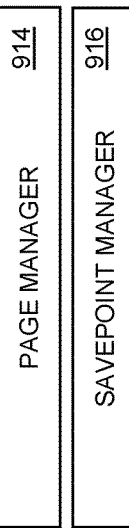
FIG. 9 is a diagram illustrating details of the system of FIG. 8.

FIG. 9 illustrates exemplary software architecture 900, according to some implementations of the current subject matter. A data storage application 804, which may be implemented in one or more of hardware and software, may include one or more of a database application, a network-attached storage system, or the like. According to at least some implementations of the current subject matter, such a data storage application 804 may include or otherwise interface with a persistence layer 812 or other type of memory buffer, for example via a persistence interface 902. A page buffer 904 within the persistence layer 812 may store one or more logical pages 906, and optionally may include shadow pages, active pages, and the like. The logical pages 906 retained in the persistence layer 812 may be written to a storage (e.g. a longer term storage, etc.) 814 via an input/output component 816, which may be a software module, a sub-system implemented in one or more of software and hardware, or the like. The storage 814 may include one or more data volumes 910 where stored pages 912 are allocated at physical memory blocks.

In some implementations, the data storage application 804 may include or be otherwise in communication with a page manager 914 and/or a savepoint manager 916. The page manager 914 may communicate with a page management module 920 at the persistence layer 812 that may include a free block manager 922 that monitors page status information 924, for example the status of physical pages within the storage 814 and logical pages in the persistence layer 812 (and optionally in the page buffer 904). The savepoint manager 916 may communicate with a savepoint coordinator 926 at the persistence layer 812 to handle savepoints, which are used to create a consistent persistent state of the database for restart after a possible crash.

In some implementations of a data storage application 804, the page management module of the persistence layer 812 may implement a shadow paging. The free block manager 922 within the page management module 920 may maintain the status of physical pages. The page buffer 904 may include a fixed page status buffer that operates as discussed herein. A converter component 940, which may be part of or in communication with the page management module 920, may be responsible for mapping between logical and physical pages written to the storage 814. The converter 940 may maintain the current mapping of logical pages to the corresponding physical pages in a converter table 942. The converter 940 may maintain a current mapping of logical pages 906 to the corresponding physical pages in one or more converter tables 942. When a logical page 906 is read from storage 814, the storage page to be loaded may be looked up from the one or more converter tables 942 using the converter 940. When a logical page is written to storage 814 the first time after a savepoint, a new free physical page is assigned to the logical page. The free block manager 922 marks the new physical page as "used" and the new mapping is stored in the one or more converter tables 942.

The persistence layer 812 may ensure that changes made in the data storage application 804 are durable and that the data storage application 804 may be restored to a most recent committed state after a restart. Writing data to the storage 814 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 944 may also be included to store the changes made to the data of the data storage application in a linear log. The logger component 944 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 944 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 812 may use a combination of undo log entries (from one or more logs) and shadow paging.

The persistence interface 902 may handle read and write requests of stores (e.g., in-memory stores, etc.). The persistence interface 902 may also provide write methods for writing data both with logging and without logging. If the logged write operations are used, the persistence interface 902 invokes the logger 944. In addition, the logger 944 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 944. For an entry of type "update", for example, this would be the identification of the affected record and the after image of the modified data.

When the data application 804 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 944 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 944 may write a database log (or simply referred to herein as a "log") sequentially into a memory buffer in natural order (e.g., sequential order, etc.). If several physical hard disks/storage devices are used to store log data, several log partitions may be defined. Thereafter, the logger 944 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 804 may use shadow paging so that the savepoint manager 916 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 10:
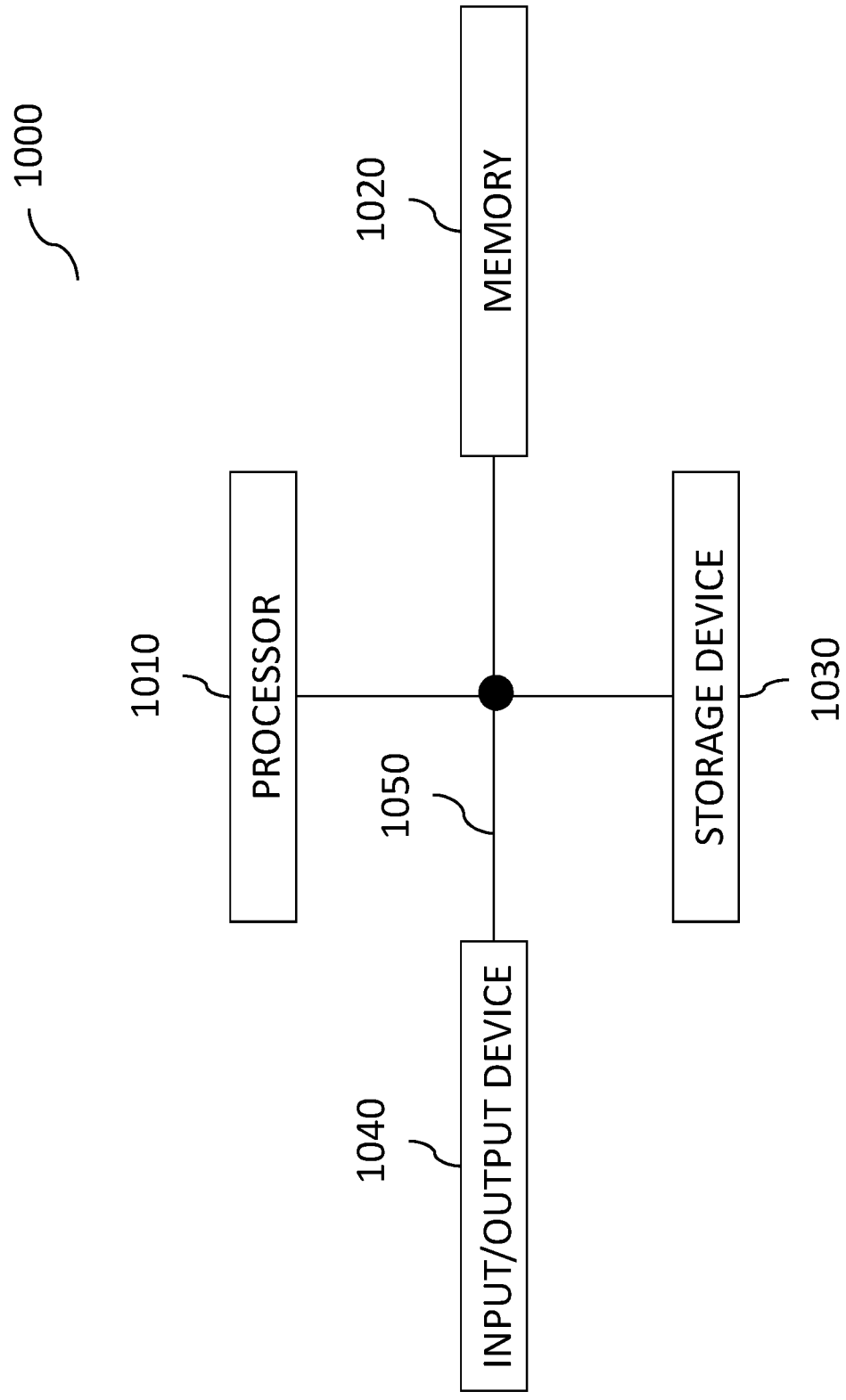
FIG. 10 is an exemplary system, according to some implementations of the current subject matter.

In some implementations, the current subject matter may be configured to be implemented in a system 1000, as shown in FIG. 10. The system 1000 may include a processor 1010, a memory 1020, a storage device 1030, and an input/output device 1040. Each of the components 1010, 1020, 1030 and 1040 may be interconnected using a system bus 1050. The processor 1010 may be configured to process instructions for execution within the system 1000. In some implementations, the processor 1010 may be a single-threaded processor. In alternate implementations, the processor 1010 may be a multi-threaded processor. The processor 1010 may be further configured to process instructions stored in the memory 1020 or on the storage device 1030, including receiving or sending information through the input/output device 1040. The memory 1020 may store information within the system 1000. In some implementations, the memory 1020 may be a computer-readable medium. In alternate implementations, the memory 1020 may be a volatile memory unit. In yet some implementations, the memory 1020 may be a non-volatile memory unit. The storage device 1030 may be capable of providing mass storage for the system 1000. In some implementations, the storage device 1030 may be a computer-readable medium. In alternate implementations, the storage device 1030 may be a floppy disk device, a hard disk device, an optical disk device, a tape device, non-volatile solid state memory, or any other type of storage device. The input/output device 1040 may be configured to provide input/output operations for the system 1000. In some implementations, the input/output device 1040 may include a keyboard and/or pointing device. In alternate implementations, the input/output device 1040 may include a display unit for displaying graphical user interfaces.

Figure 11:
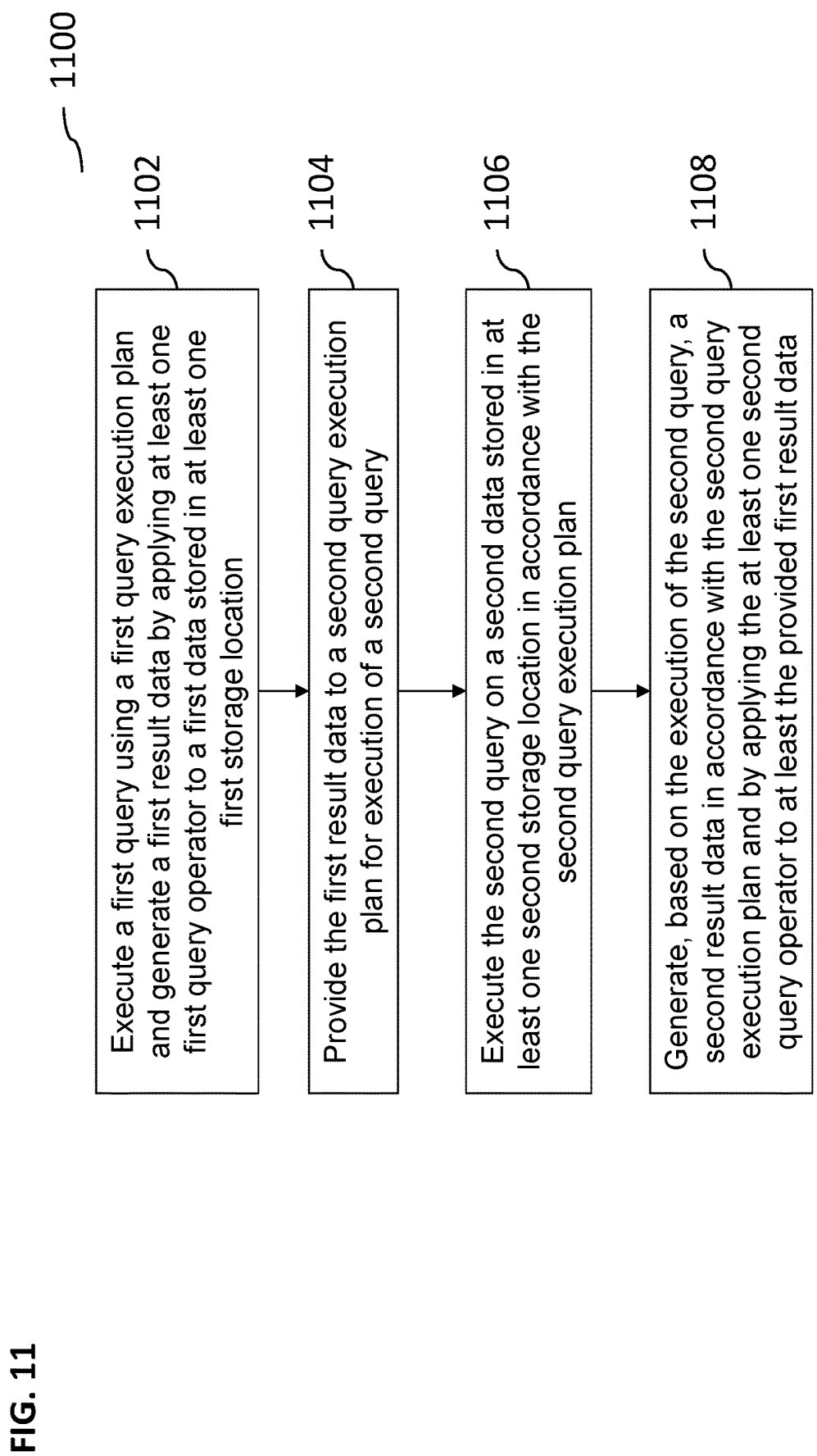
FIG. 11 is an exemplary method, according to some implementations of the current subject matter.

FIG. 11 illustrates an exemplary method 1100 for execution of queries, according to some implementations of the current subject matter. At 1102, a first query (e.g., query 300 shown in FIG. 3, query 400 shown in FIG. 4, etc.) may be executed using a first query execution plan (as shown in FIGS. 3, 4, etc.). A first result data (e.g., intermediate result 4) by applying at least one first query operator (e.g., operator 3) to a first data stored in at least one first storage location. (e.g., source 302, source 402, a table, a database, etc.). At 1104, the first result data (e.g., intermediate result 4) to a second query execution plan for execution of a second query (e.g., query 320 shown in FIG. 3, query 420 shown in FIG. 4, etc.). At 1106, the second query may be executed on a second data stored in at least one second storage location (e.g., source 322, 422, etc.) in accordance with the second query execution plan. The second query execution plan may include at least one second query operator (e.g., operator 6). At 1108, based on the execution of the second query, a second result data (e.g., result 330, 430, etc.) may be generated in accordance with the second query execution plan and by applying the at least one second query operator to at least the provided first result data.

In some implementations, the current subject matter may include one or more of the following optional features. Execution of the second query may include determining whether to apply the at least one second query operator to the provided first result data.

In some implementations, at least one second query operator may be applied to a combination of the provided first result data and at least a portion of the second data queried from the at least one second storage location. In some implementations, the method may also include preventing application of the second query operator to the provided first result data upon determination that the second query operator is not applicable to the provided first result data.

In some implementations, the method includes applying at least one additional second query operator to generate a subset of the second result data.

The method may also include receiving an update to the first data stored in the first storage location, executing the first query on at least the updated first data stored in the first storage location and generating an updated first result data, and providing the updated first result data to the second query execution plan. The updated first data may include at least one of the following: the update to the first data, and a combination of the updated first data and the first data. The execution of the first query on at least the updated first data may be performed upon at least one of the following: receiving the update to the first data, and repeating the executing of the first query.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   executing a first query using a first query execution plan and generating a first result data by applying a first query operator to a first data stored in a first storage location;
   providing the first result data to a second query execution plan for execution of a second query;
   executing the second query on a second data stored in a second storage location in accordance with the second query execution plan, the second query execution plan including a second query operator being applied to the second data to generate second query intermediate result data, the second query being separate from the first query, and the second storage location being separate from the first storage location;
   preventing application of the second query operator to the provided first result data upon determination that the second query operator is not applicable to the provided first result data; and
   generating, based on the execution of the second query, a second result data in accordance with the second query execution plan and by applying another second query operator of the second query to a combination of the second query intermediate result data and the provided first result data.

2. The method according to claim 1, wherein the executing the second query further comprises determining whether to apply the second query operator to the provided first result data.

3. The method according to claim 1, wherein the second query operator is applied to a combination of the provided first result data and at least a portion of the second data queried from the second storage location.

4. The method according to claim 1, further comprising applying an additional second query operator to generate a subset of the second result data.

5. The method according to claim 1, further comprising receiving an update to the first data stored in the first storage location;
   executing the first query on at least the updated first data stored in the first storage location and generating an updated first result data; and
   providing the updated first result data to the second query execution plan.

6. The method according to claim 5, wherein the updated first data includes at least one of the following: the update to the first data, and a combination of the updated first data and the first data.

7. The method according to claim 5, wherein the executing the first query on at least the updated first data is performed upon at least one of the following: receiving the update to the first data, and repeating the executing of the first query.

8. A system comprising:
   at least one processor; and
   a non-transitory machine-readable medium storing instructions that, when executed by the at least one processor, cause the at least one processor to perform operations comprising:
      executing a first query using a first query execution plan and generating a first result data by applying a first query operator to a first data stored in a first storage location;
      providing the first result data to a second query execution plan for execution of a second query;

executing the second query on a second data stored in a second storage location in accordance with the second query execution plan, the second query execution plan including a second query operator being applied to the second data to generate second query intermediate result data, the second query being separate from the first query, and the second storage location being separate from the first storage location;

preventing application of the second query operator to the provided first result data upon determination that the second query operator is not applicable to the provided first result data; and generating, based on the execution of the second query, a second result data in accordance with the second query execution plan and by applying another second query operator of the second query to a combination of the second query intermediate result data and the provided first result data.

9. The system according to claim 8, wherein the executing the second query further comprises determining whether to apply the second query operator to the provided first result data.

10. The system according to claim 8, wherein the second query operator is applied to a combination of the provided first result data and at least a portion of the second data queried from the second storage location.

11. The system according to claim 8, wherein the operations further comprise applying an additional second query operator to generate a subset of the second result data.

12. The system according to claim 8, wherein the operations further comprise
receiving an update to the first data stored in the first storage location;
executing the first query on at least the updated first data stored in the first storage location and generating an updated first result data; and
providing the updated first result data to the second query execution plan.

13. The system according to claim 12, wherein the updated first data includes at least one of the following: the update to the first data, and a combination of the updated first data and the first data.

14. The system according to claim 12, wherein the executing the first query on at least the updated first data is performed upon at least one of the following: receiving the update to the first data, and repeating the executing of the first query.

15. A computer program product comprising a non-transitory machine-readable medium storing instructions that, when executed by at least one programmable processor, cause the at least one programmable processor to perform operations comprising:

executing a first query using a first query execution plan and generating a first result data by applying a first query operator to a first data stored in a first storage location;

providing the first result data to a second query execution plan for execution of a second query;

executing the second query on a second data stored in a second storage location in accordance with the second query execution plan, the second query execution plan including a second query operator being applied to the second data to generate second query intermediate result data, the second query being separate from the first query, and the second storage location being separate from the first storage location;

preventing application of the second query operator to the provided first result data upon determination that the second query operator is not applicable to the provided first result data; and generating, based on the execution of the second query, a second result data in accordance with the second query execution plan and by applying another second query operator of the second query to a combination of the second query intermediate result data and the provided first result data.

16. The computer program product according to claim 15, wherein the executing the second query further comprises determining whether to apply the second query operator to the provided first result data.

17. The computer program product according to claim 15, wherein the second query operator is applied to a combination of the provided first result data and at least a portion of the second data queried from the second storage location.

* * * * *